(12) United States Patent
Feillias et al.

(10) Patent No.: US 7,484,309 B2
(45) Date of Patent: Feb. 3, 2009

(54) SYSTEM FOR MEASURING DIMENSIONS INSIDE A HOLLOW SHAFT, PARTICULARLY ONE BELONGING TO AN AERONAUTICAL TURBOMACHINE

(75) Inventors: Alain George Albert Feillias, Soisy sur Ecole (FR); Dominique Bernard Lourdin, Milly la Foret (FR); Bernard Philippe Jacques Paillarse, Corbeil Essonnes (FR); Christophe Francis Pinchon, Pringy (FR)

(73) Assignee: SNECMA, Paris (FR)

( * ) Notice: Subject to any disclaimer, the term of this patent is extended or adjusted under 35 U.S.C. 154(b) by 14 days.

(21) Appl. No.: 11/685,397

(22) Filed: Mar. 13, 2007

(65) Prior Publication Data

US 2007/0214672 A1    Sep. 20, 2007

(30) Foreign Application Priority Data

Mar. 14, 2006  (FR) ................................. 06 50864

(51) Int. Cl.
*G01B 5/12* (2006.01)

(52) U.S. Cl. ........................................ 33/544; 33/544.3
(58) Field of Classification Search .................. 33/544, 33/544.1, 544.2, 544.3, 549, 555, 551
See application file for complete search history.

(56) References Cited

U.S. PATENT DOCUMENTS

| | | | |
|---|---|---|---|
| 2,497,990 A * | 2/1950 | Huber et al. ................ 33/544.3 |
| 2,645,027 A * | 7/1953 | Eastman et al. ............. 33/544.3 |
| 2,680,913 A * | 6/1954 | Johnston et al. ............. 33/544.2 |
| 2,864,173 A * | 12/1958 | Castel ........................ 33/544.2 |
| 2,946,130 A * | 7/1960 | Groner et al. ............... 33/544.3 |
| 4,977,681 A * | 12/1990 | Jiles .......................... 33/544.5 |
| 5,116,234 A * | 5/1992 | Bertz et al. .................... 33/550 |
| 5,146,690 A * | 9/1992 | Breitmeier ................... 33/551 |
| 5,205,047 A * | 4/1993 | Danielli ........................ 33/542 |
| 5,479,721 A * | 1/1996 | Wickander ................... 33/531 |
| 5,542,188 A * | 8/1996 | Ertl et al. ...................... 33/605 |
| 6,065,219 A | 5/2000 | Murphey et al. |
| 6,427,353 B1 * | 8/2002 | Nelson et al. ................. 33/552 |
| 6,560,889 B1 | 5/2003 | Lechen |
| 6,931,748 B2 * | 8/2005 | Lam et al. ...................... 33/544 |

FOREIGN PATENT DOCUMENTS

GB    2 259 770 A    3/1993

* cited by examiner

*Primary Examiner*—Christopher W Fulton
(74) *Attorney, Agent, or Firm*—Oblon, Spivak, McClelland, Maier & Neustadt, P.C.

(57) ABSTRACT

A system for measuring an internal dimension, such as the radius, of a cylindrical cavity over a determined length, particularly in a hollow shaft belonging to a turbomachine. The system includes a measurement module mounted removably on a support that has translational mobility inside and along the axis of the cavity, the module including a measurement component for measuring the dimension and delivering signals corresponding to the measured values and incorporating a recording and storage for recording and storing the values. More particularly, the module includes a mechanical sensor component able to move between a retracted position and an extended position for sensing the internal surface of the cavity.

16 Claims, 3 Drawing Sheets

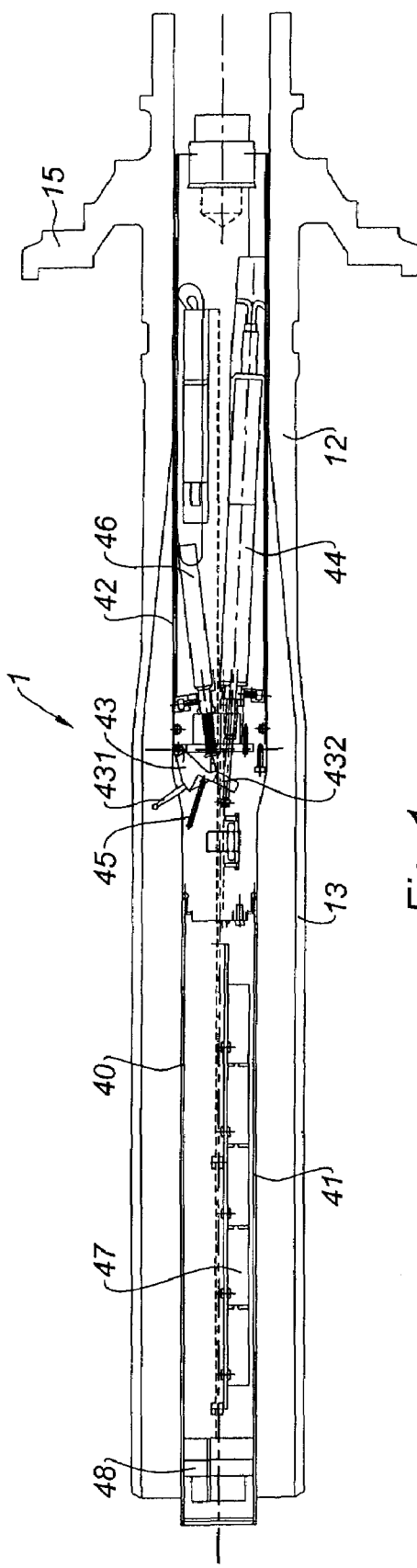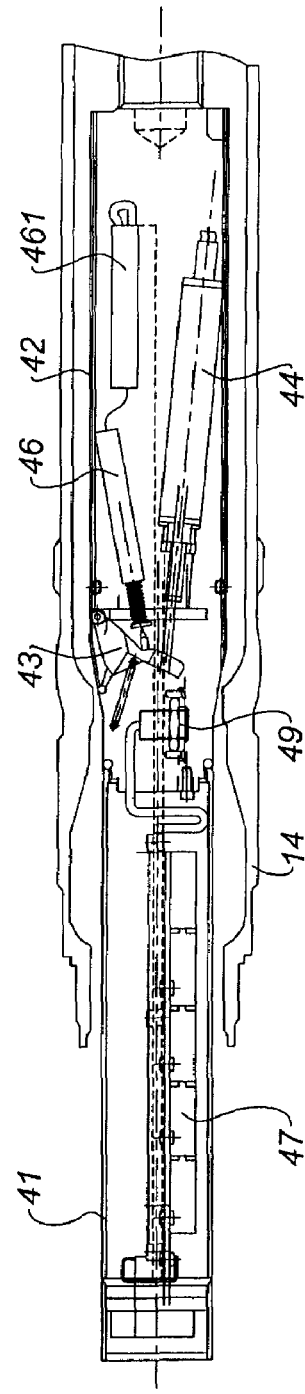
Fig. 1
Fig. 2

SYSTEM FOR MEASURING DIMENSIONS INSIDE A HOLLOW SHAFT, PARTICULARLY ONE BELONGING TO AN AERONAUTICAL TURBOMACHINE

The present invention relates to the field of turbomachines and is aimed at a means for measuring the internal dimensions of a hollow shaft.

BACKGROUND OF THE INVENTION

In a turbomachine such as an aeronautical gas turbine engine, the shafts connecting the various compressor and turbine disks are principal component parts revolving at high speed and capable of withstanding high loadings while at the same time needing to remain relatively light in weight. Their manufacture involves boring a longitudinal cavity in the forging, the exterior surface of which has already been machined. After this boring operation, the internal dimensions of the shaft need to be checked in order in particular to be able to make any corrections that might be needed in order to confine the wall thickness to a certain tolerance band.

DESCRIPTION OF THE PRIOR ART

The conventional means known to the applicant for performing dimensional checks on a bored hole are time-consuming and limited to a partial check, of the order of ten or so measurement points on a shaft 1500 mm long. One known means is to perform the check using a machine of the three-dimensional measurement type. These means involve in particular taking impressions in order to allow measurements to be performed in regions which have radii of curvature or gradients that are difficult to access, and this is a complex and lengthy operation.

SUMMARY OF THE INVENTION

The applicant has set itself the objective of creating a measurement system capable of checking the dimensions inside a shaft after the longitudinal cavity has been bored out.

Another objective is to be able to perform the checking operations while the workpiece is still in place on the machine tool, without having to move it to a dedicated measurement installation.

Another objective is to be able to take the measurements at a higher speed than before and over a large number of points.

Another objective is to allow realignment with respect to the initial bore during the finishing rework operations.

It has been possible to achieve these objectives using a system for measuring an internal dimension of a cylindrical cavity over a determined length, such as in a turbomachine hollow shaft, which system comprises a measurement module mounted removably on a support that has translational mobility inside and along the axis of the cavity, the module comprising a measurement component for measuring the dimension and delivering signals corresponding to the measured values and incorporating a recording and storage means for recording and storing said values.

For preference, the module comprises a measurement component of the mechanical sensor type able to move between a retracted position and an extended position for sensing the internal surface of the cavity. This arrangement allows the module to be installed precisely inside the cavity without having to allow for a risk of damaging the measurement component.

According to another feature, the component is placed in position by control means, the power supply of which is built into said measurement module.

More specifically, when the cavity is the result of the boring-out of a cylindrical metal workpiece using machining, the mobile support is the arbor that acts as a support for the boring head of said machine tool.

According to another feature, when the machine tool has an automatic control station, the latter comprises a control means for controlling the position of the arbor axially and/or angularly, and a control means for controlling the measurement component. For preference, control signals are transmitted between the control station and the measurement module wirelessly, for instance using infrared.

According to another feature, the system comprises a data reading means for reading the data recorded in the module.

BRIEF DESCRIPTION OF THE DRAWINGS

Other features will emerge from the following description of a nonlimiting embodiment of the method of the invention, this description being accompanied by the attached figures in which:

FIG. 1 depicts a measurement module according to the invention, placed inside a hollow shaft of a turbine in a first position, FIG. 2 shows the module inside the turbine shaft of this example, in position at the distal end of the shaft.

DESCRIPTION OF THE PREFERRED EMBODIMENT

Figure 3:
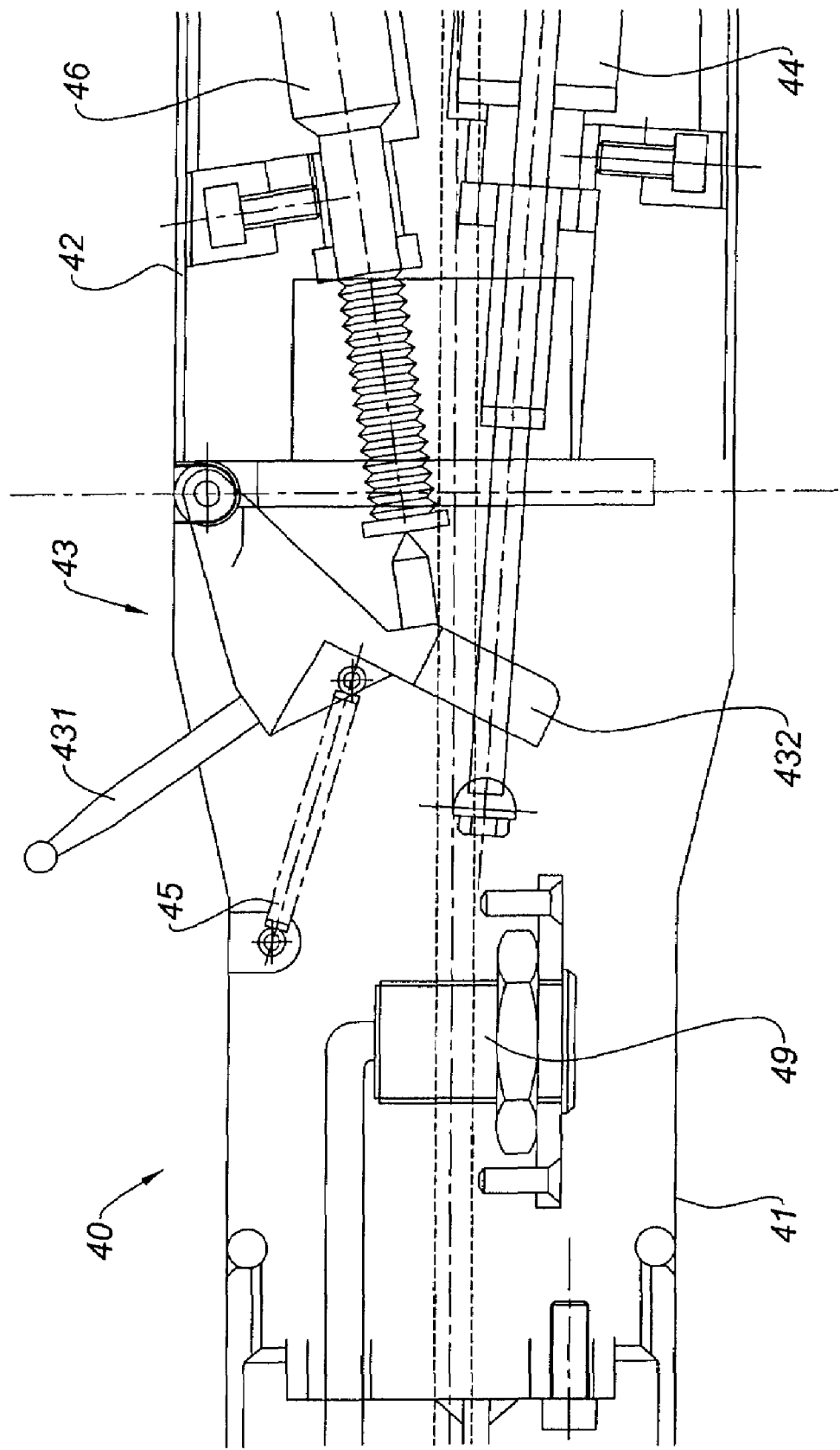
FIG. 3 shows, in greater detail, the part of the measurement module that has the sensing measurement component, FIG. 4 schematically depicts the control of the measurement system.

As can be seen in FIGS. 1 to 4, the workpiece, the internal dimensions of which are to be checked in this instance, is a turbine shaft. The shaft 1 has been manufactured by forging a lump of metal to give it the desired exterior shape. Next, the workpiece has been externally machined. Finally it has been placed on a support 2 and bored out by machining from one end 11 which is the proximal end, as far as its opposite end 14, termed the distal end. The machine tool 3 comprises an arbor 31 rotated about itself and driven in a translational movement along an axis XX by a drive unit 32 provided with suitable drive means. These elements are depicted schematically in FIG. 4.

In order to bore the shaft 1, the arbor 31 is equipped at its distal end with an appropriate tool. This is not depicted as the boring operation has been completed.

FIGS. 1 and 2 show the geometry of the shaft 1 in cross section. The diameter of the central cavity is not constant between the two ends 11 and 14. This diameter is constant over a first, entry, portion 11; it widens gradually over a second portion 12 that forms a frustoconical internal surface, then remains constant over a third portion 13, which is the longest portion. It then narrows and continues with a more complex shape over a final portion 14.

The exterior shape is substantially cylindrical with a flanged portion 15 near the entry 11. This flange is used to connect the shaft to the turbine rotor, not shown.

The system of the invention has been developed in order to check the surface of the internal cavity essentially along the second and third portions 12 and 13 to which access is reduced.

The system of the invention comprises a measurement module 40 of tubular shape made in two parts 41 and 42. The distal part 41 has a diameter slightly smaller than that of the proximal part 42. The adjective "proximal" denotes the part closest to the drive system 32. "Distal" denotes the part furthest from the drive system 32.

The diameter of the tubular part 41 allows it to pass through the aperture of the portion 14 of the shaft. The diameter of the part 42 allows the module 40 to be introduced via the portion 11 of the shaft. Here it exceeds the aperture of the portion 14. When housed inside the shaft, the axis of the module 40 coincides with the axis XX of the shaft. A securing means 421 has the function of removably mounting the module 40 on the arbor 31 of the machine 3. This means is shaped in such a way as to fit onto the arbor 31 in the same way as the tool for which the module is substituted.

In the intermediate zone between the parts 41 and 42 the module comprises a sensing measurement component 43 in the form of a lever shaped as a right-angled bracket, articulated about an axis perpendicular to the axis XX. One leg 431 of the bracket is provided at its free end with a sensing ball; the other leg 432 is connected to an electrically-operated tension actuator 44 working in opposition with a tension spring 45. In order to bring the sensing component 43 into the retracted position the actuator is made to apply tension against the force of the spring 45. When the actuator is released, the spring pulls on the leg 432 and this causes the leg 431 with the sensing ball to leave the tubular envelope of the module 40.

A rule 46 is also mechanically connected to the leg 432. Its purpose is to make a precise note of the movement of the component 43. To this end, it is electrically connected to a data storage and recording means 461. The Heidenhain company provide one example of this kind of rule.

The tubular part 41 contains an electrical accumulator cell 47 to power the actuator 44 when this actuator is activated. Its free end is provided with an interface 48 for receiving infrared signals, converting the infrared signals into electrical signals for controlling the actuator, and electrical signals for recording the value recorded by the rule 46, respectively.

The module comprises an electrical connection means 49 for connection to a corresponding external means via which the accumulator cell 47 can be recharged and the data recorded in the data storage means 461 transferred to an external reading means.

Figure 4:
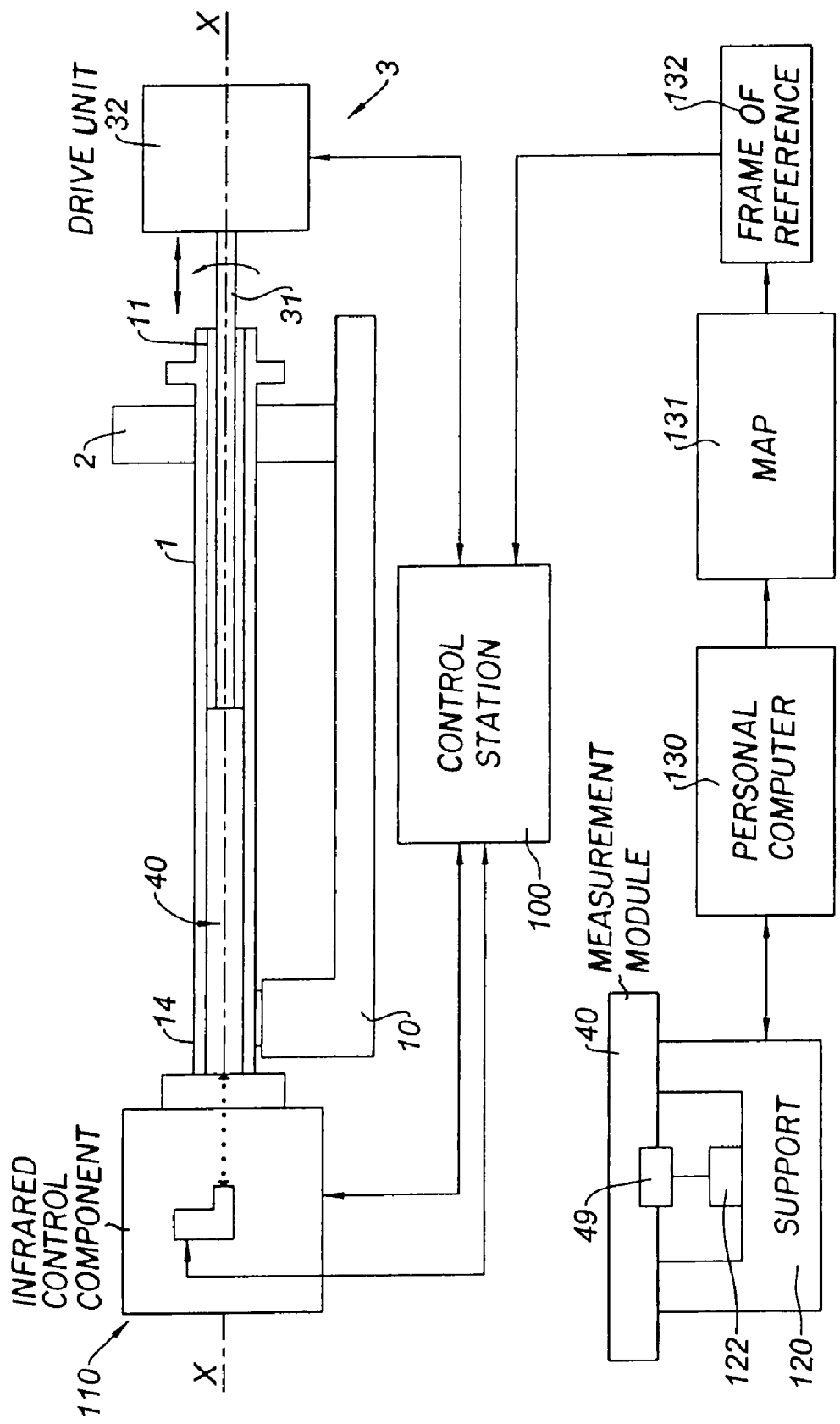

FIG. 4 shows the diagram for control of the system. The control station 100 of the machine tool is connected to the shaft drive system in order to set both the axial position of this shaft 31 and its angular position about the axis XX. The station 100 is also connected to an infrared control component 110 which is positioned along the axis XX facing the interface 48.

The system also comprises a support 120 for the measurement module 40, situated close to the machining and checking installation, on which it can be positioned with its connection means 49 engaged with a corresponding connection means 122 belonging to the support 120 to allow, on the one hand, recharging of the accumulator cell 47 and, on the other hand, recovery of the data present in the data storage means 461.

This support 120 is connected to a calculating means, such as a personal computer 130, equipped with data processing software.

As can be seen in the figure, it is possible, according to the results of the analysis of the values, to envision transmitting a machining command to the control station 100 in order to make the necessary corrections to the machining. This corrective action can be performed because the shaft is present on the machine tool. This is one advantage of the system.

The way the system works is as follows.

Once the shaft 1 has been fully bored out, the boring head is extracted from the shaft 31 and the boring tool is dismantled from it. The turbine shaft 1 thus machined remains in place on the support 2, so that its internal dimensions can be checked and recorded according to the invention. The tool is replaced by the measurement module 40 of the invention.

As can be seen in the figure, the device comprises a bed 10 forming a support for the workpiece 1. The workpiece 1 is supported at one end by a steady 2 into which it is slid and in which it is positioned precisely in space. The workpiece is supported in the lengthwise direction.

The measurement module 40 has been mounted on the shaft 31 of the boring head in place of the boring tool. At the opposite end of the bed to the boring head drive means, and in the continuation of the axis XX there is the infrared control system 110 for controlling the components contained in the measurement head.

The measurement module 40 thus receives the control signals from the control unit 100.

When the module is in place on the boring head, the device is started up by infrared remote control. Everything is operated by the control station 100. The first step consists in calibrating the device along the abscissa X, along the axis XX, and along the ordinate Z, perpendicular to the axis XX.

The station 100 controls the drive unit 32 in such a way as to bring the module 40 into position at the distal end as in FIG. 2, at the maximum depth.

Through the infrared control 110 and the interface 48, the measurement component 43 is extended. This operation is performed by cutting off the electrical power supply to the actuator, the tension spring 45 then causing the leg 431 to pivot out of the module 40. It comes to bear via the ball against the internal wall of the shaft. An ordinate's measurement Z on the rule 46 corresponds to this position of the component 43. Furthermore, the axial position X is known.

The program begins the series of measurements by making the module 40 move in the direction of the proximal end 11 over successive determined points axially separated for example by 0.1 mm, and at different angular positions, for example four angular positions (at 0°, 90°, 180° and 270°). At these defined points, the Z-value supplied by the rule 46 is recorded. When the series of measurements has been completed, the module 40 is withdrawn from the shaft and placed on the support 120 to gather all the Z-data stored in the memories 461. These data are transmitted to the computer 130 where they are analyzed. On the strength of this information, the operator can take the necessary steps, for example can use the control station 100, which also comprises the numerical control means for controlling the machining, to command the external machining needed to correct the wall thickness.

In other words, in order to work, the system requires dedicated software to control and exploit the data recorded in the module 40. This module 40 is run by a software which receives commands from the unit 100 by infrared; the unit 100 also controls the synchronizing of the clock cards between the arbor 31 and the measurement head 40.

Data processing is performed away from the machine tool by a personal computer 130 which compares the readings from the unit 40 with the theoretical model. This comparison provides a map 131 of the recorded dimensions, indicating the value of dimensions that are out of tolerance. This record also acts as a frame of reference 132 for balancing the workpiece during finishing operations, chiefly for machining the exterior shape which needs to be concentric with the readings from the module 40.

The invention claimed is:

1. A system for measuring an internal dimension, of a cylindrical cavity over a determined length in a turbomachine hollow shaft, said system comprising:
a measurement module mounted removably on a mobile support that has translational mobility inside and along a longitudinal axis of the cavity, the measurement module comprising a measurement component for measuring the internal dimension and delivering signals corresponding to measured values and incorporating a recording and storage device for recording and storing said measured values,
wherein said measurement module includes at least a tubular proximal part having a first outer diameter and a tubular distal part having a second outer diameter, said first outer diameter being larger than said second outer diameter,
wherein said proximal and distal parts are separated by a tubular intermediate part having an envelope of varying outer diameter,
wherein said measurement component includes a movable mechanical sensor that is movable between a retracted position and an extended position,
wherein, in said retracted position, said mechanical sensor is inside said envelope of said intermediate part, and
wherein, in said extended position, said mechanical sensor extends outside said envelope of said intermediate part.

2. The system as claimed in claim 1, wherein the mechanical sensor includes a sensing ball for sensing an internal surface of the cavity in said extended position.

3. The system as claimed in claim 1, further comprising an actuator that controls the position of the measurement component, and a power supply for supplying power to said actuator, said power supply being located inside said measurement module.

4. The system as claimed in claim 3, wherein said mechanical sensor includes a bracket with a first arm including a sensing ball at a free end of said first arm, said bracket further including a second arm connected to said actuator.

5. The system as claimed in claim 4, wherein said bracket is a right-angled bracket articulated about an axis perpendicular to the longitudinal axis of the cavity.

6. The system as claimed in claim 4, wherein said mechanical sensor is coupled to a tension spring.

7. The system as claimed in claim 6, wherein said actuator applies tension against the force of the tension spring in the retracted position and the tension spring pulls the second arm of the bracket in the extended position.

8. The system as claimed in claim 4, wherein said actuator is inside said tubular proximal part both in said retracted position and in said extended position.

9. The system as claimed in claim 8, wherein said second arm of said bracket is inside said tubular proximal part both in said retracted position and in said extended position.

10. The system as claimed in claim 3, wherein said actuator is located inside said tubular proximal part and said power supply is located inside said tubular distal part.

11. The system as claimed in claim 10, further comprising an infrared interface located inside said tubular distal part, said infrared interface receiving infrared signals and converting the infrared signals into electrical signals for controlling said actuator.

12. The system as claimed in claim 1, wherein the mobile support is an arbor that acts as a support for a boring head of a machine tool used to hollow out said cavity.

13. The system as claimed in claim 12, further comprising an automatic control station for controlling the machine tool, said automatic control station comprising a control means for controlling the position of the arbor axially and/or angularly.

14. The system as claimed in claim 13, wherein the control station comprises a control means for controlling the measurement component.

15. The system as claimed in claim 14, wherein the control means transmits wireless control commands using infrared beams.

16. The system as claimed in claim 1, further, comprising a data reading means for reading data recorded in the measurement module.

* * * * *